(12) United States Patent
Wu et al.

(10) Patent No.: US 11,841,278 B2
(45) Date of Patent: Dec. 12, 2023

(54) TEMPERATURE MEASUREMENT SENSOR, TEMPERATURE MEASUREMENT SYSTEM, AND TEMPERATURE MEASUREMENT METHOD

(71) Applicant: Tokyo Electron Limited, Tokyo (JP)

(72) Inventors: Tong Wu, Miyagi (JP); Tomohide Minami, Miyagi (JP); Masaaki Miyagawa, Miyagi (JP)

(73) Assignee: Tokyo Electron Limited, Tokyo (JP)

( * ) Notice: Subject to any disclaimer, the term of this patent is extended or adjusted under 35 U.S.C. 154(b) by 606 days.

(21) Appl. No.: 16/976,732

(22) PCT Filed: Jul. 11, 2019

(86) PCT No.: PCT/JP2019/027599
§ 371 (c)(1),
(2) Date: Aug. 28, 2020

(87) PCT Pub. No.: WO2020/013299
PCT Pub. Date: Jan. 16, 2020

(65) Prior Publication Data
US 2020/0408613 A1    Dec. 31, 2020

(30) Foreign Application Priority Data

Jul. 12, 2018   (JP) .................................. 2018-132459

(51) Int. Cl.
*G01K 11/32*    (2021.01)
*G01J 5/0821*   (2022.01)
*G01K 11/324*   (2021.01)

(52) U.S. Cl.
CPC ............ *G01K 11/32* (2013.01); *G01J 5/0821* (2013.01); *G01K 11/324* (2021.01)

(58) Field of Classification Search
CPC .............................. G01J 5/0821; G01K 11/324
(Continued)

(56) References Cited

U.S. PATENT DOCUMENTS 4,448,547 A * 5/1984 Wickersheim ..... G01K 11/3213
250/461.1
5,156,461 A * 10/1992 Moslehi ................ G01J 5/0896
374/161
(Continued)

FOREIGN PATENT DOCUMENTS

CN       102165350 A  *  8/2011  ......... G02B 6/12019
DE       3142131 A1   *  5/1983
(Continued)

OTHER PUBLICATIONS

International Search Report issued in PCT/JP2019/027599; dated Sep. 3, 2019.

*Primary Examiner* — Gail Kaplan Verbitsky
(74) *Attorney, Agent, or Firm* — Studebaker & Brackett PC

(57) ABSTRACT

A temperature measurement sensor according to an exemplary embodiment includes a substrate and an optical fiber provided on an upper surface of the substrate and extending along the upper surface. The temperature measurement sensor further includes a light introduction path of a space that allows a space above the upper surface and a space below a lower surface of the substrate to communicate with each other and an optical coupling portion provided on the upper surface and disposed in the light introduction path. The optical coupling portion is optically connected to the end surface of the optical fiber. The optical fiber forms the first pattern shape and the second pattern shape. The first pattern shape includes the optical fiber more densely than the second pattern shape. Light incident on the optical coupling portion from a side of the lower surface through the light introduction path reaches the end surface through the optical coupling portion.

10 Claims, 6 Drawing Sheets

(58) Field of Classification Search
USPC .............................. 374/130, 131; 356/43, 44
See application file for complete search history.

(56) References Cited

U.S. PATENT DOCUMENTS

| | | | | |
|---|---|---|---|---|
| 5,775,808 A * | 7/1998 | Pan | ................... | G01K 11/3213 |
| | | | | 374/161 |
| 5,874,711 A * | 2/1999 | Champetier | .......... | G01J 5/0003 |
| | | | | 359/359 |
| 6,190,040 B1 * | 2/2001 | Renken | ............ | H01L 21/67248 |
| | | | | 374/E1.019 |
| 6,325,536 B1 * | 12/2001 | Renken | ............ | G01K 11/3213 |
| | | | | 374/161 |
| 6,353,210 B1 * | 3/2002 | Norrbakhsh | ............ | C30B 31/18 |
| | | | | 219/390 |
| 6,616,332 B1 * | 9/2003 | Renken | ................. | G01K 11/12 |
| | | | | 374/E11.018 |
| 7,355,715 B2 * | 4/2008 | Suzuki | ............... | G01B 9/02019 |
| | | | | 385/12 |
| 2009/0034581 A1 * | 2/2009 | Carcasi | ................... | G01K 1/143 |
| | | | | 374/E1.001 |
| 2009/0034582 A1 * | 2/2009 | Carcasi | ................... | G01K 1/026 |
| | | | | 374/E1.001 |
| 2012/0230364 A1 * | 9/2012 | Maeda | ...................... | G01J 5/02 |
| | | | | 374/121 |
| 2015/0007665 A1 * | 1/2015 | Britton | ..................... | G01K 7/16 |
| | | | | 250/208.2 |
| 2018/0261481 A1 * | 9/2018 | Eto | ................... | H01L 21/67288 |

FOREIGN PATENT DOCUMENTS

| | | | | | |
|---|---|---|---|---|---|
| EP | | 801292 | A2 * | 10/1997 | ............ G01J 5/0003 |
| EP | | 3023757 | A1 * | 5/2016 | ............ B29C 64/20 |
| JP | | 2004-507889 | A | 3/2004 | |
| JP | | 2018152542 | A * | 9/2018 | ............ G01K 11/32 |
| WO | WO-0003216 | | A1 * | 1/2000 | ......... G01K 11/3213 |
| WO | | 02/17030 | A2 | 2/2002 | |
| WO | | 2017/183471 | A1 | 10/2017 | |
| WO | WO-2017183471 | | A1 * | 10/2017 | ............ G01K 11/32 |

\* cited by examiner

TEMPERATURE MEASUREMENT SENSOR, TEMPERATURE MEASUREMENT SYSTEM, AND TEMPERATURE MEASUREMENT METHOD

TECHNICAL FIELD

Exemplary embodiments of the present disclosure relate to a temperature measurement sensor, a temperature measurement system, and a temperature measurement method.

BACKGROUND ART

In a sensor device disclosed in Patent Literature 1, a sensor measures a characteristic of processing, and the measured data is processed by an information processor. With the processing, the sensor device generates a corresponding model, and the generated corresponding model is transmitted to an external communicator by an internal communicator.

A temperature measurement substrate disclosed in Patent Literature 2 includes at least one optical fiber and a substrate. The substrate is any of a semiconductor wafer or a flat panel display substrate. The optical fiber is laid on a surface of the substrate and has a first pattern portion and a second pattern portion formed more densely than the first pattern portion.

CITATION LIST

Patent Literature

[Patent Literature 1] Japanese Unexamined Patent Publication No. 2004-507889
[Patent Literature 2] WO 2017/183471

SUMMARY OF INVENTION

Technical Problem

The present disclosure provides a technique in which a device used to measure a temperature is easily installed.

Solution to Problem

In one exemplary embodiment, a temperature measurement sensor is provided. The temperature measurement sensor includes a substrate and an optical fiber provided on an upper surface of the substrate and extending along the upper surface. The temperature measurement sensor further includes a light introduction path of a space that allows a space above the upper surface and a space below a lower surface of the substrate to communicate with each other, and an optical coupling portion provided on the upper surface and disposed in the light introduction path. The optical coupling portion is optically connected to an end surface of the optical fiber. The optical fiber forms a first pattern shape and a second pattern shape. The first pattern shape includes the optical fiber more densely than the second pattern shape. Light incident on the optical coupling portion from a lower surface side through the light introduction path reaches the end surface through the optical coupling portion.

Advantageous Effects of Invention

With the temperature measurement sensor and the temperature measurement system according to one exemplary embodiment, the device used to measure the temperature is easily installed.

DESCRIPTION OF EMBODIMENTS

Figure 1:
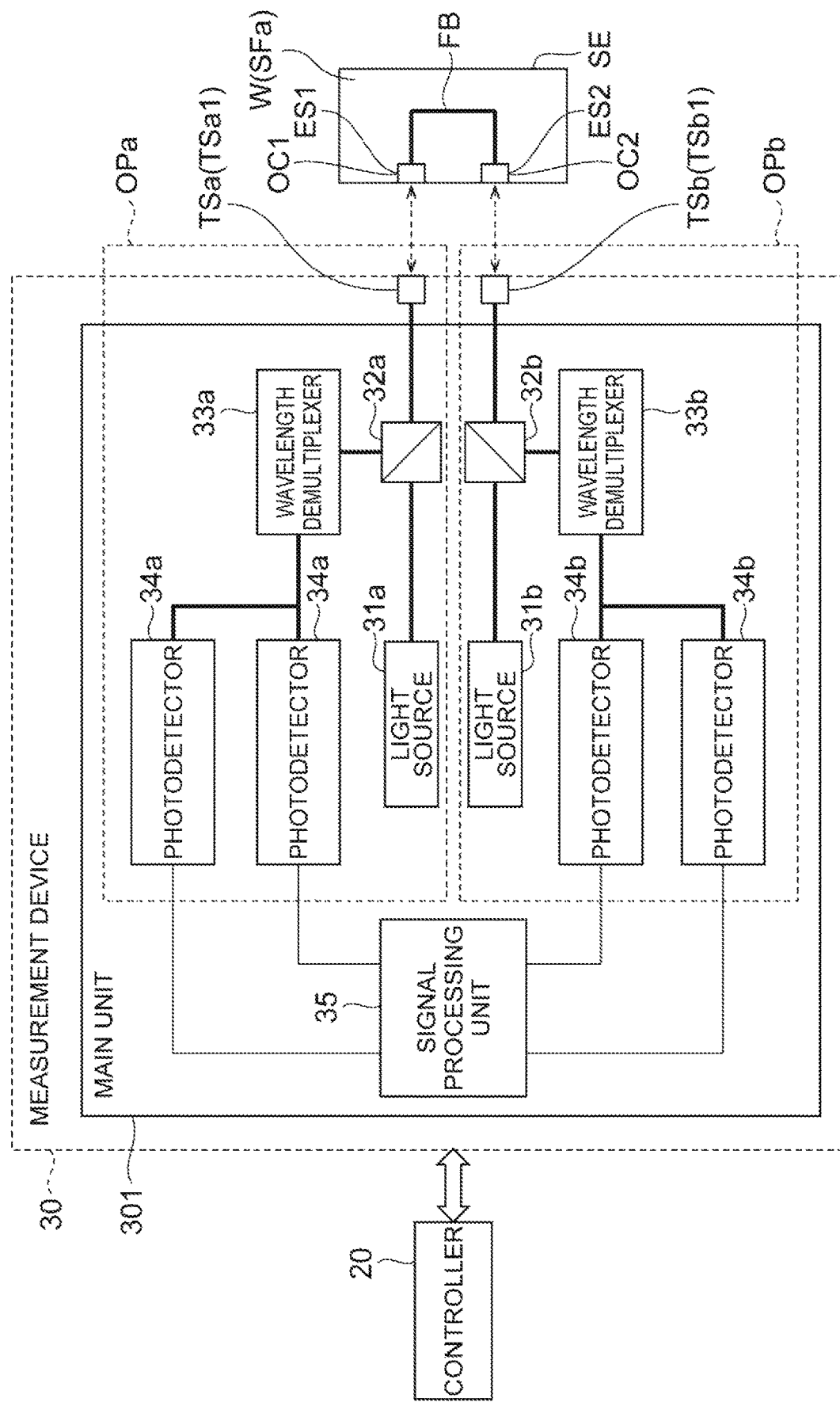
FIG. 1 is a diagram showing a configuration of a temperature measurement system according to an exemplary embodiment.

Hereinafter, various exemplary embodiments will be described. In one exemplary embodiment, a temperature measurement sensor is provided. The temperature measurement sensor includes a substrate and an optical fiber provided on an upper surface of the substrate and extending along the upper surface. The temperature measurement sensor further includes a light introduction path of a space that allows a space above the upper surface and a space below a lower surface of the substrate to communicate with each other, and an optical coupling portion provided on the upper surface and disposed in the light introduction path. The optical coupling portion is optically connected to an end surface of the optical fiber. The optical fiber forms the first pattern shape and the second pattern shape. The first pattern shape includes the optical fiber more densely than the second pattern shape. Light incident on the optical coupling portion from a lower surface side through the light introduction path reaches the end surface through the optical coupling portion.

The optical coupling portion optically connected to the optical fiber is disposed in the light introduction path. When the light incident through the light introduction path reaches the optical coupling portion, the light reaches the optical fiber through the optical coupling portion. Therefore, it is possible to measure the temperature using the optical fiber by mounting the substrate provided with the optical fiber on the upper surface that emits the light. Accordingly, the temperature measurement sensor, particularly the optical fiber used for the temperature measurement, can be easily installed. The temperature measurement sensor can be easily carried into a process chamber without exposing, out to the atmosphere, the process chamber into which the temperature measurement sensor is carried. Therefore, a temperature measurement time can be shortened. The temperature measurement sensor (configuration on the substrate) used for the temperature measurement does not require electric power. Therefore, a battery used to supply the electric power is unnecessary. A temperature measurement range is widened without being limited to a battery operating temperature range since the battery is unnecessary.

In one aspect, the light introduction path may be, for example, a through hole or a cutout provided in the substrate. Therefore, a light loss may be sufficiently suppressed when the light is introduced into the optical coupling portion through the light introduction path.

In one aspect, the optical coupling portion includes, for example, a light reflector and a collimating lens. The light reflector may be disposed on the light introduction path. The collimating lens may be disposed between the light reflector and the end surface. The light incident on the optical coupling portion from the lower surface side through the light introduction path can reach the end surface through the light reflector and the collimating lens in order. The optical coupling portion includes the light reflector and the collimating lens. Therefore, the light incident on the optical coupling portion through the light introduction path may reach the end surface of the optical fiber in a good condition.

In one aspect, the light reflector may be, for example, a prism or a mirror. The light reflector is the prism or the mirror. Therefore, a configuration of the light reflector may be simplified and the light reflector may be easily manufactured.

In one exemplary embodiment, a temperature measurement system is provided. The temperature measurement system includes the temperature measurement sensor described above and a measurement device that measures the temperature of the substrate of the temperature measurement sensor. The measurement device inputs the light into the optical fiber, which is included in the temperature measurement sensor and provided on the upper surface of the substrate, receives backscattered light emitted from the optical fiber according to the light, and measures the substrate temperature based on the received backscattered light.

The optical coupling portion optically connected to the optical fiber is disposed in the light introduction path. When the light incident from the measurement device through the light introduction path reaches the optical coupling portion, the light reaches the optical fiber through the optical coupling portion. Therefore, it is possible to measure the temperature using the optical fiber by mounting the substrate provided with the optical fiber on the upper surface that emits the light. Accordingly, the temperature measurement sensor, particularly the optical fiber used for the temperature measurement, can be easily installed. The temperature measurement sensor (configuration on the substrate) used for the temperature measurement does not require the electric power. Therefore, the battery used to supply the electric power is unnecessary.

In one aspect, the measurement device may include, for example, a pusher pin. The pusher pin may include, for example, an optical waveguide portion. The measurement device may input the light into the optical fiber through an end portion of the optical waveguide portion. The backscattered light emitted from the optical fiber according to the light incident on the optical fiber may be incident on the end portion. The light can be incident on the temperature measurement sensor through the pusher pin. Therefore, the light can be introduced using an existing path without significantly modifying the device.

In one aspect, the end portion may include, for example, a convex lens. The convex lens at the end portion and the optical coupling portion may form a collimating optical system. Accordingly, such a collimating optical system may reduce a positional deviation of the light.

In one aspect, a material of the optical waveguide portion may be, for example, sapphire. Since the optical waveguide portion includes sapphire, influences of temperature change, mechanical stress, and the like may be suppressed and thus a shape of the optical waveguide portion may be maintained accurately. Therefore, the light may be accurately introduced into the temperature measurement sensor.

In one mode, the measurement device includes a second collimating lens. The measurement device inputs the light into the optical fiber through the second collimating lens, and the backscattered light emitted from the optical fiber according to the light incident on the optical fiber is incident on the second collimating lens. Since the light can be incident on the temperature measurement sensor through the second collimating lens, the configuration of the optical system is simple and the system is easily manufactured.

In one exemplary embodiment, a temperature measurement method is provided. The temperature measurement method includes a first step, a second step, and a third step. In the first step, the light is incident on the optical fiber extending along the upper surface of the substrate. In the second step, the backscattered light emitted from the optical fiber according to the light, incident on the optical fiber, in the first step is received. In the third step, the substrate temperature is measured based on the backscattered light received in the second step. In the first step, the light is incident from the lower surface side to the optical coupling portion provided on the upper surface, through the light introduction path of the space that allows the space above the upper surface of the substrate and the space below the lower surface of the substrate to communicate with each other. The optical coupling portion is optically connected to the end surface of the optical fiber. The optical fiber forms the first pattern shape and the second pattern shape. The first pattern shape includes the optical fiber more densely than the second pattern shape.

The optical coupling portion optically connected to the optical fiber is disposed in the light introduction path. When the light incident through the light introduction path in the first step reaches the optical coupling portion, the light reaches the optical fiber through the optical coupling portion. In the second step, the backscattered light emitted from the optical fiber according to the light incident on the optical fiber in the first step is received. In the third step, the substrate temperature is measured based on the backscattered light. Therefore, it is possible to measure the temperature using the optical fiber by mounting the substrate provided with the optical fiber on the upper surface that emits the light. Accordingly, the optical fiber used for the temperature measurement can be easily installed. The temperature measurement sensor can be easily carried into the process chamber without exposing, out to the atmosphere, the process chamber into which the temperature measurement sensor is carried. Therefore, the temperature measurement time can be shortened. Since the configuration on the substrate used for the temperature measurement does not require the electric power, the battery used to supply the electric power is unnecessary. The temperature measurement range is widened without being limited to the battery operating temperature range since the battery is unnecessary.

In one aspect, a series of pieces of processing including the first step, the second step, and the third step may be alternately performed on two end surfaces of the optical fiber. As described above, the temperature measurement is performed using the backscattered light emitted from each of the two end surfaces of the optical fiber. Therefore, a temperature measurement error may be reduced, and an operating temperature range of the temperature measurement system may be widened.

Hereinafter, various exemplary embodiments will be described in detail with reference to the drawings. In each drawing, the same reference numeral is assigned to the same or corresponding portion.

Figure 2:
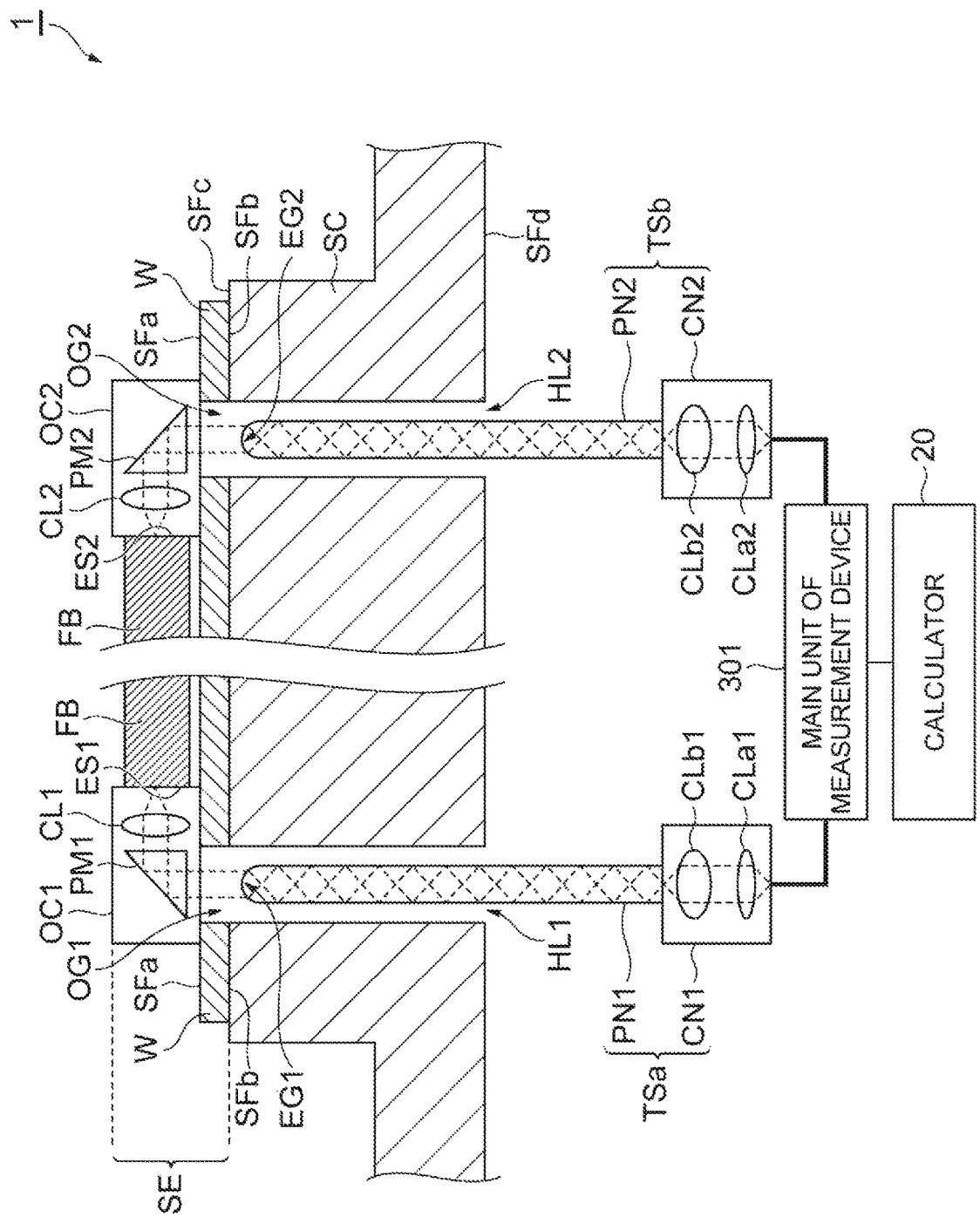
FIG. 2 is a diagram showing a configuration of an optical terminal and a temperature measurement sensor shown in FIG. 1 in more detail.

A temperature measurement system 1 according to an exemplary embodiment will be described with reference to FIGS. 1 and 2. The temperature measurement system 1 includes a temperature measurement sensor SE, a controller 20, and a measurement device 30.

In the temperature measurement system 1, an optical fiber FB laid on an upper surface SFa of a substrate W is used as a temperature detector. The temperature measurement system 1 uses Raman scattered light included in the backscattered light emitted from the optical fiber FB according to the incidence of the light on the optical fiber FB to measure a temperature distribution along the optical fiber FB. The temperature measurement system 1 may be used for a substrate processing device (for example, a plasma processing device) that performs predetermined processing such as heat treatment on the substrate such as a semiconductor wafer.

The temperature measurement sensor SE includes the substrate W, the optical fiber FB, an optical coupling portion OC1, and an optical coupling portion OC2. The substrate W includes the upper surface SFa and a lower surface SFb. The substrate W includes a light introduction path OG1 and a light introduction path OG2.

Both the light introduction path OG1 and the light introduction path OG2 are spaces that communicate a space above the upper surface SFa with a space below the lower surface SFb. Both the light introduction path OG1 and the light introduction path OG2 may be through holes or cutouts provided in the substrate W.

The optical fiber FB is laid on the upper surface SFa. The optical fiber FB is provided on the upper surface SFa and extends along the upper surface SFa.

The optical coupling portion OC1 is provided on the upper surface SFa of the substrate W and disposed in the light introduction path OG1. The optical coupling portion OC1 includes a light reflector PM1 and a collimating lens CL1 (first collimating lens). The light reflector PM1 is disposed on the light introduction path OG1. The collimating lens CL1 is disposed between the light reflector PM1 and an end surface ES1 of the optical fiber FB.

The end surface ES1 of the optical fiber FB is optically connected to the collimating lens CL1. The light incident on the optical coupling portion OC1 from the lower surface SFb side through the light introduction path OG1 reaches the end surface ES1 of the optical fiber FB through the optical coupling portion OC1 (more specifically, through the light reflector PM1 and the collimating lens CL1 in order).

The optical coupling portion OC2 is provided on the upper surface SFa of the substrate W and is disposed in the light introduction path OG2. The optical coupling portion OC2 includes a light reflector PM2 and a collimating lens CL2 (first collimating lens). The light reflector PM2 is disposed on the light introduction path OG2. The collimating lens CL2 is disposed between the light reflector PM2 and the end surface ES2 of the optical fiber FB.

Both the light reflector PM1 and the light reflector PM2 may be prisms or mirrors.

The end surface ES2 of the optical fiber FB is optically connected to the collimating lens CL2. The light incident on the optical coupling portion OC2 from the lower surface SFb side through the light introduction path OG2 reaches the end surface ES2 of the optical fiber FB through the optical coupling portion OC2 (more specifically, through the light reflector PM2 and the collimating lens CL2 in order).

Each configuration of the light introduction path OG1, the optical coupling portion OC1, and the end surface ES1 is the same as each configuration of the light introduction path OG2, the optical coupling portion OC2, and the end surface ES2.

In the present disclosure, the temperature measurement sensor SE is disposed in the processing device that processes the semiconductor substrate, and is particularly mounted on an upper surface SFc of an electrostatic chuck SC that holds the semiconductor substrate. The lower surface SFb of the substrate W and the upper surface SFc of the electrostatic chuck SC are in contact with each other.

The electrostatic chuck SC includes the upper surface SFc and a lower surface SFd. The electrostatic chuck SC is provided with a through hole HL1 and a through hole HL2. Both the through holes HL1 and HL2 are spaces that communicate a space above the upper surface SFc with a space below the lower surface SFd.

The light introduction path OG1 of the substrate W is disposed on the through hole HL1 of the electrostatic chuck SC, and the light introduction path OG1 and the through hole HL1 communicate with each other. The light introduction path OG2 of the substrate W is disposed on the through hole HL2 of the electrostatic chuck SC, and the light introduction path OG2 and the through hole HL2 communicate with each other. The through hole HL1 and the through hole HL2 have the same configuration.

The optical coupling portion OC1 is optically connected to the end surface ES1 of the optical fiber FB. The optical coupling portion OC2 is optically connected to the end surface ES2 of the optical fiber FB.

The controller 20 is a computer or the like that controls each part of the measurement device 30. The controller 20 may particularly control an emission of light from light sources 31$a$ and 31$b$, an operation of a signal processing unit 35, and the like.

The measurement device 30 measures the temperature of the substrate W of the temperature measurement sensor SE. The measurement device 30 inputs the light into the optical fiber FB, which is included in the temperature measurement sensor SE and provided on the upper surface SFa of the substrate W, through each of the optical coupling portion OC1 and the optical coupling portion OC2. The incidence of light from the measurement device 30 to the optical fiber FB through the optical coupling portion OC1 and the incidence of light from the measurement device 30 to the optical fiber FB through the optical coupling portion OC2 may be alternately executed at different timings, for example.

The measurement device 30 receives, through the optical coupling portion OC1, the backscattered light emitted from the optical fiber FB according to the light incident through the optical coupling portion OC1. The measurement device 30 measures the temperature of the substrate W based on the backscattered light received through the optical coupling portion OC1. The measurement device 30 receives, through the optical coupling portion OC2, the backscattered light emitted from the optical fiber FB according to the light incident through the optical coupling portion OC2. The measurement device 30 measures the temperature of the substrate W based on the backscattered light received through the optical coupling portion OC2.

The measurement device 30 includes an optical transceiver OPa, an optical transceiver OPb, and a signal processing unit 35. The optical transceiver OPa and the optical transceiver OPb are connected to the signal processing unit 35.

The optical transceiver OPa includes an optical terminal TSa, the light source 31a, a beam splitter 32a, a wavelength demultiplexer 33a, and a photodetector 34a. The optical terminal TSa includes an optical waveguide portion PN1 and an optical coupling portion CN1. The optical coupling portion CN1 includes a collimating lens CLa1 and a collimating lens CLb1.

The optical waveguide portion PN1 of the optical terminal TSa is disposed in the through hole HL1 of the electrostatic chuck SC in an insertable and removable manner. The measurement device 30 inputs the light into the optical fiber FB from the end portion EG1 of the optical waveguide portion PN1 through the optical coupling portion OC1 and the end surface ES1. The backscattered light emitted from the optical fiber FB through the end surface ES1 according to the light incident on the optical fiber FB is incident on the optical waveguide portion PN1 through the end portion EG1.

The end portion EG1 of the optical waveguide portion PN1 may include, for example, the convex lens. A material of the optical waveguide portion PN1 may be, for example, sapphire.

The collimating lens CLa1 and the collimating lens CLb1 may form the collimating optical system. The light emitted from the light source 31a of a main unit 301 reaches the optical waveguide portion PN1 through the collimating lens CLa1 and the collimating lens CLb1 in order, advances in the optical waveguide portion PN1, and is emitted from the end portion EG1 toward the optical coupling portion OC1.

The optical transceiver OPb includes an optical terminal TSb, the light source 31b, a beam splitter 32b, a wavelength demultiplexer 33b, and a photodetector 34b. The optical terminal TSb includes an optical waveguide portion PN2 and an optical coupling portion CN2. The optical coupling portion CN2 includes a collimating lens CLa2 and a collimating lens CLb2.

The optical waveguide portion PN2 of the optical terminal TSb is disposed in the through hole HL2 of the electrostatic chuck SC in an insertable and removable manner. The measurement device 30 inputs the light into the optical fiber FB from the end portion EG2 of the optical waveguide portion PN2 through the optical coupling portion OC2 and the end surface ES2. The backscattered light emitted from the optical fiber FB through the end surface ES2 according to the light incident on the optical fiber FB is incident on the optical waveguide portion PN2 through the end portion EG2.

The end portion EG2 of the optical waveguide portion PN2 may include, for example, the convex lens. A material of the optical waveguide portion PN2 may be, for example, sapphire.

The collimating lens CLa2 and the collimating lens CLb2 may form the collimating optical system. The light emitted from the light source 31b of the main unit 301 reaches the optical waveguide portion PN2 through the collimating lens CLa2 and the collimating lens CLb2 in order, advances in the optical waveguide portion PN2, and is emitted from the end portion EG2 toward the optical coupling portion OC2.

The measurement device 30 includes the main unit 301. Configurations excluding the optical terminal TSa and the optical terminal TSb among a plurality of components of the measurement device 30 are included in the main unit 301. The configuration of the measurement device 30 excluding the optical terminal TSa and the optical terminal TSb has the light source 31a, the beam splitter 32a, the wavelength demultiplexer 33a, the photodetector 34a, the light source 31b, the beam splitter 32b, the wavelength demultiplexer 33b, the photodetector 34b, and the signal processing unit 35.

A configuration of the optical transceiver OPa is the same as a configuration of the optical transceiver OPb. The measurement device 30 according to the present disclosure includes both the optical transceiver OPa and the optical transceiver OPb, but may include only any one of the optical transceiver OPa and the optical transceiver OPb.

The configuration in which the measurement device 30 includes only any one of the optical transceiver OPa and the optical transceiver OPb may be referred to as a single-end type. The configuration in which the measurement device 30 includes both the optical transceiver OPa and the optical transceiver OPb may be referred to as a double-end type. In the present disclosure, particularly the configuration of the optical transceiver OPa is described in detail. However, the configuration of the optical transceiver OPb is the same as the configuration of the optical transceiver OPa, and thus the description of the configuration of the optical transceiver OPb is omitted.

The light source 31a outputs laser light (pulse light) having a pulse length set in advance in a cycle set in advance. The pulse light output from the light source 31a is emitted from the optical terminal TSa (more specifically, the end portion EG1 of the optical terminal TSa) through the beam splitter 32a and the optical terminal TSa in order and reaches the end surface of the optical fiber FB through the optical coupling portion OC1 of the temperature measurement sensor SE. The light incident on the optical fiber FB from the end surface ES1 advances in the optical fiber FB while being scattered by molecules constituting the optical fiber FB. A part of the scattered light generated in the optical fiber FB returns to an incident end (end surface ES1) as the backscattered light.

The measurement device 30 may include a plurality of pusher pins. In the case, each of two pusher pins of the plurality of pusher pins may include, for example, each of the optical waveguide portion PN1 and the optical waveguide portion PN2.

Raman scattered light (Stokes light and anti-Stokes light), which is one of the backscattered light, has temperature dependence. The temperature dependence of the anti-Stokes light is larger than that of the Stokes light. The Stokes light is Raman scattered light shifted to a longer wavelength side than the incident light, and the anti-Stokes light is Raman scattered light shifted to a shorter wavelength side than the incident light.

The backscattered light is emitted from the incident end (end surface ES1) of the optical fiber FB passing through the inside of the optical fiber FB, reaches the beam splitter 32a through the optical coupling portion OC1 and the optical terminal TSa in order, is reflected by the beam splitter 32a, and is incident on the wavelength demultiplexer 33a.

The wavelength demultiplexer 33a includes a beam splitter, an optical filter, a condenser lens, and the like, separates the Raman scattered light into the Stokes light and the anti-Stokes light, and inputs the separated light to the photodetector 34a. The photodetector 34a outputs an electric signal according to intensities of the Stokes light and the anti-Stokes light to the signal processing unit 35. The signal processing unit 35 calculates the temperature distribution of the optical fiber FB in a length direction based on the electric signal output from the photodetector 34.

As described above, the temperature measurement system 1 detects the temperature dependence of the Raman scattered light, which is one of the backscattered light, using the optical fiber FB laid on the upper surface SFa of the substrate W as the temperature detector to calculate the temperature distribution of the substrate W. A round-trip time from when the pulse light is incident on the optical fiber FB from the incident end (end surface ES1) until the backward Raman scattered light generated in the optical fiber FB returns to the incident end (end surface ES1) is measured to calculate a position (distance) at which the backward Raman scattered light is generated.

Figure 3:
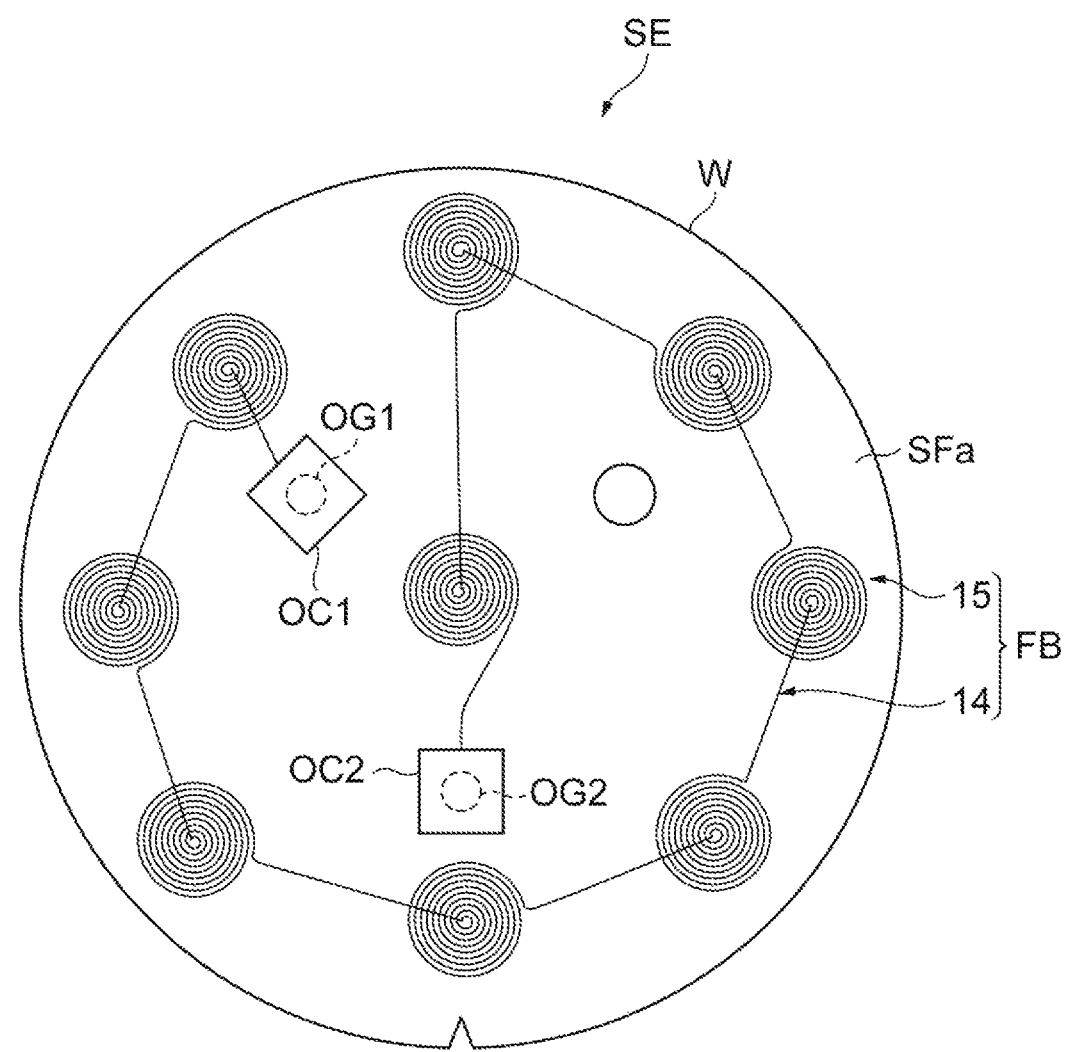
FIG. 3 is a diagram showing an example of configurations of a substrate and an optical fiber shown in FIGS. 1 and 2 in more detail.
Figure 4:
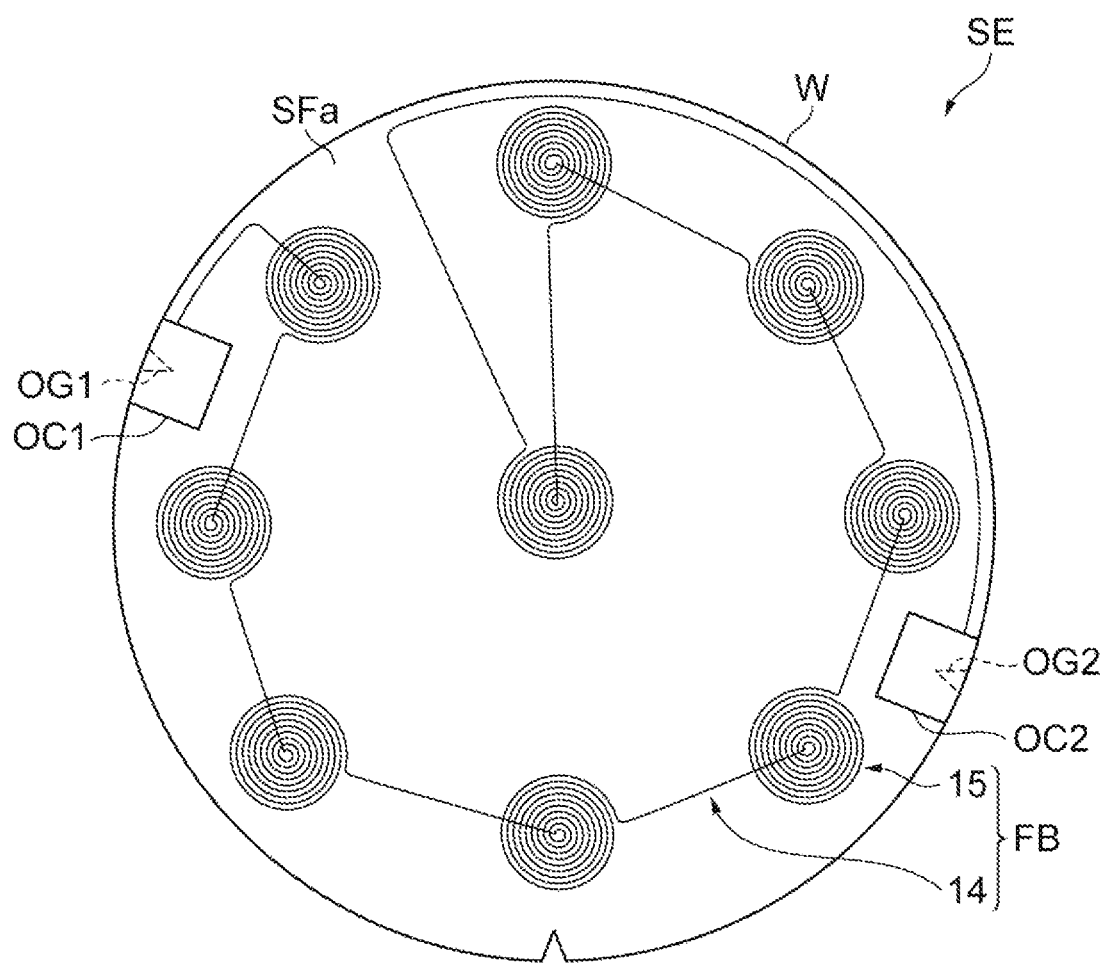
FIG. 4 is a diagram showing another example of the configurations of the substrate and the optical fiber shown in FIGS. 1 and 2 in more detail.

A configuration of the temperature measurement sensor SE according to one exemplary embodiment will be further described with reference to FIGS. 3 and 4. FIGS. 3 and 4 show configurations of the substrate W and the optical fiber FB as viewed from above the upper surface SFa. The temperature measurement sensor SE shown in FIG. 3 and the temperature measurement sensor SE shown in FIG. 4 are different from each other in installation places of the light introduction path OG1 and the light introduction path OG2 provided in the substrate W.

In the case of the temperature measurement sensor SE shown in FIG. 3, each of the light introduction path OG1 and the light introduction path OG2 is a through hole provided in the substrate W. In the case, each of the light introduction path OG1 and the light introduction path OG2 is disposed, for example, at a position on which the pusher pin abuts, and the optical waveguide portion PN1 of the optical terminal TSa is particularly the pusher pin.

In the case of the temperature measurement sensor SE shown in FIG. 4, each of the light introduction path OG1 and the light introduction path OG2 is the cutout provided in the substrate W. In the case, each of the light introduction path OG1 and the light introduction path OG2 may be, for example, a notch in the substrate W.

A material of the substrate W may be, for example, silicon (Si). A diameter of the substrate W is not particularly limited, but may be about 300, 450 [mm], for example.

The optical fiber FB may be a single thin fibrous tube made of, for example, quartz glass, plastic, or the like. The optical fiber FB includes the two end surfaces (end surface ES1 and end surface ES2). The end surface ES1 is connected to the optical coupling portion OC1 provided on the light introduction path OG1. The end surface ES2 is connected to the optical coupling portion OC2 provided on the light introduction path OG2.

The pulse light output from the light source 31a is incident on the optical fiber FB through the end surface ES1. The pulse light output from the light source 31b is incident on the optical fiber FB through the end surface ES2.

The optical fiber FB forms the first pattern shape 14 and the second pattern shape 15 between the end surface ES1 and the end surface ES2. The first pattern shape 14 includes the optical fibers FB more densely than the second pattern shape 15. The first pattern shapes 14 and the second pattern shapes 15 of the optical fiber FB are alternately disposed on the upper surface SFa.

The number of the first pattern shapes 14 and the number of the second pattern shapes 15 are not particularly limited, but may be determined according to the size of the substrate W and the like. In a case where the optical fiber FB has a plurality of second pattern shapes 15, respective second pattern shapes 15 may have the same shape or different shapes.

Figure 5:
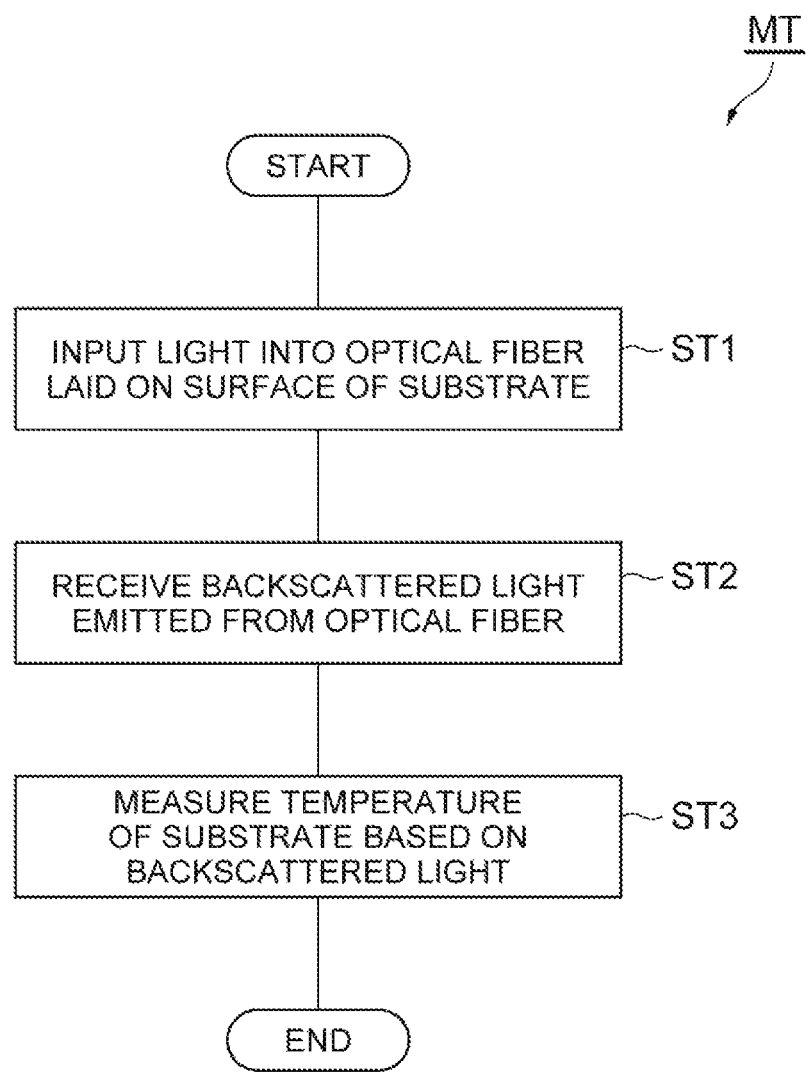
FIG. 5 is a flowchart showing a temperature measurement method according to an exemplary embodiment.

A temperature measurement method MT according to one exemplary embodiment will be described with reference to FIG. 5. The temperature measurement method MT includes step ST1 (first step), step ST2 (second step), and step ST3 (third step). The temperature measurement method MT may be executed by causing the controller 20 to operate each component of the temperature measurement system 1. In a case where the temperature measurement system 1 is the double-end type, a series of pieces of processing including step ST1, step ST2, and step ST3 may be alternately performed on the two end surfaces (end surface ES1, end surface ES2) of the optical fiber FB.

First, in step ST1, the light is incident on the optical fiber FB from the measurement device 30. In particular, in a case where the temperature measurement system 1 is the double-end type, the light emission from the light source 31a and the light emission from the light source 31b are alternately performed at different timings.

In step ST2 subsequent to step ST1, the backscattered light emitted from the optical fiber FB according to the light incident on the optical fiber FB in step ST1 is received. In particular, in a case where the temperature measurement system 1 is the double-end type, the backscattered light generated according to the light incident from the end surface ES1 is emitted from the end surface ES1 and the backscattered light generated according to the light incident from the end surface ES2 is emitted from the end surface ES2.

In step ST3 subsequent to step ST2, the temperature of the substrate W is measured based on the backscattered light received in step ST2. In particular, in a case where the temperature measurement system 1 is the double end method, the backscattered light output from both end surfaces (end surface ES1 and end surface ES2) of the optical fiber FB is used. Therefore, the temperature measurement error may be reduced, and an operating temperature range of the temperature measurement system 1 may be widened.

As described above, each of the optical coupling portion OC1 and the optical coupling portion OC2, which are optically connected to the optical fiber FB, is disposed in each of the light introduction path OG1 and the light introduction path OG2. When the light incident through each of the light introduction path OG1 and the light introduction path OG2 reaches each of the optical coupling portion OC1 and the optical coupling portion OC2, the light reaches the optical fiber FB through each of the optical coupling portion OC1 and the optical coupling portion OC2. Therefore, it is possible to measure the temperature using the optical fiber FB by mounting the substrate W provided with the optical fiber FB on the upper surface SFc of the electrostatic chuck SC that emits the light. Accordingly, the temperature measurement sensor SE, particularly the optical fiber FB used for the temperature measurement, can be easily installed. The temperature measurement sensor SE can be easily carried into the process chamber without exposing, out to the atmosphere, the process chamber into which the temperature measurement sensor SE is carried. Therefore, the temperature measurement time can be shortened. The temperature measurement sensor SE (configuration on the substrate W) used for the temperature measurement does not require the electric power. Therefore, the battery used to supply the electric power is unnecessary. The temperature measurement range is widened without being limited to the battery operating temperature range since the battery is unnecessary.

In a case where the light introduction path OG1 and the light introduction path OG2 are the through holes or the cutouts provided in the substrate W, the light loss may be sufficiently suppressed when the light is introduced into each of the optical coupling portion OC1 and the optical coupling portion OC2 through each of the light introduction path OG1 and the light introduction path OG2.

The optical coupling portion OC1 includes the light reflector PM1 and the collimating lens CL1. Therefore, the light incident on the optical coupling portion OC1 through the light introduction path OG1 may reach the end surface ES1 of the optical fiber FB in a good condition. The optical coupling portion OC2 includes the light reflector PM2 and the collimating lens CL2. Therefore, the light incident on the optical coupling portion OC2 through the light introduction path OG2 may reach the end surface ES2 of the optical fiber FB in a good condition.

Each of the light reflector PM1 and the light reflector PM2 is the prism or the mirror. Therefore, the configuration of each of the light reflector PM1 and the light reflector PM2 may be simplified and each of the light reflector PM1 and the light reflector PM2 may be easily manufactured.

The measurement device 30 may include, for example, the plurality of pusher pins. Each of the two pusher pins of the plurality of pusher pins may include each of the optical waveguide portion PN1 and the optical waveguide portion PN2. In the case, the light can be incident on the temperature measurement sensor SE through the pusher pin. Therefore, the light can be introduced using an existing path without significantly modifying the device.

Each of the end portion EG1 of the optical waveguide portion PN1 and the end portion EG2 of the optical waveguide portion PN2 may include, for example, the convex lens. In the case, the convex lens of the end portion EG1 and the optical coupling portion OC1 form one collimating optical system, and the convex lens of the end portion EG2 and the optical coupling portion OC2 form one collimating optical system. Accordingly such a collimating optical system may reduce a positional deviation of the light.

A material of each of the optical waveguide portion PN1 and the optical waveguide portion PN2 may be, for example, sapphire. In the case, each of the optical waveguide portions PN1 and PN2 includes sapphire. Therefore, the influences of temperature change, mechanical stress, and the like may be suppressed, and respective shapes of the optical waveguide portions PN1 and PN2 may be maintained accurately. Therefore, the light may be accurately introduced into the temperature measurement sensor SE.

Each of the optical coupling portion OC1 and the optical coupling portion OC2, which are optically connected to the optical fiber FB, is disposed in each of the light introduction path OG1 and the light introduction path OG2. In step ST1 of the temperature measurement method MT, when the light incident through the light introduction path OG1 reaches the optical coupling portion OC1, the light reaches the optical fiber through the optical coupling portion OC1. In step ST1 of the temperature measurement method MT, when the light incident through the light introduction path OG2 reaches the optical coupling portion OC2, the light reaches the optical fiber through the optical coupling portion OC2. In step ST2, the backscattered light emitted from the optical fiber FB according to the light incident on the optical fiber FB in step ST1 is received. In step ST3, the temperature of the substrate W is measured based on the backscattered light. Therefore, it is possible to measure the temperature using the optical fiber FB by mounting the substrate W provided with the optical fiber FB on the upper surface SFc of the electrostatic chuck SC that emits the light. Accordingly, the optical fiber FB used for the temperature measurement can be easily installed. The temperature measurement sensor SE can be easily carried into the process chamber without exposing, out to the atmosphere, the process chamber into which the temperature measurement sensor SE is carried. Therefore, the temperature measurement time can be shortened. The temperature measurement sensor SE (configuration on the substrate W) used for the temperature measurement does not require the electric power. Therefore, the battery used to supply the electric power is unnecessary. The temperature measurement range is widened without being limited to the battery operating temperature range since the battery is unnecessary.

The temperature measurement is performed using the backscattered light emitted from each of the two end surfaces (end surface ES1 and end surface ES2) of the optical fiber FB. Therefore, the temperature measurement error may be reduced, and the operating temperature range of the temperature measurement system 1 may be widened.

Although various exemplary embodiments have been described above, various omissions, substitutions, and changes may be made without being limited to the exemplary embodiments described above. It is also possible to combine elements in different embodiments to form another embodiment.

Figure 6:
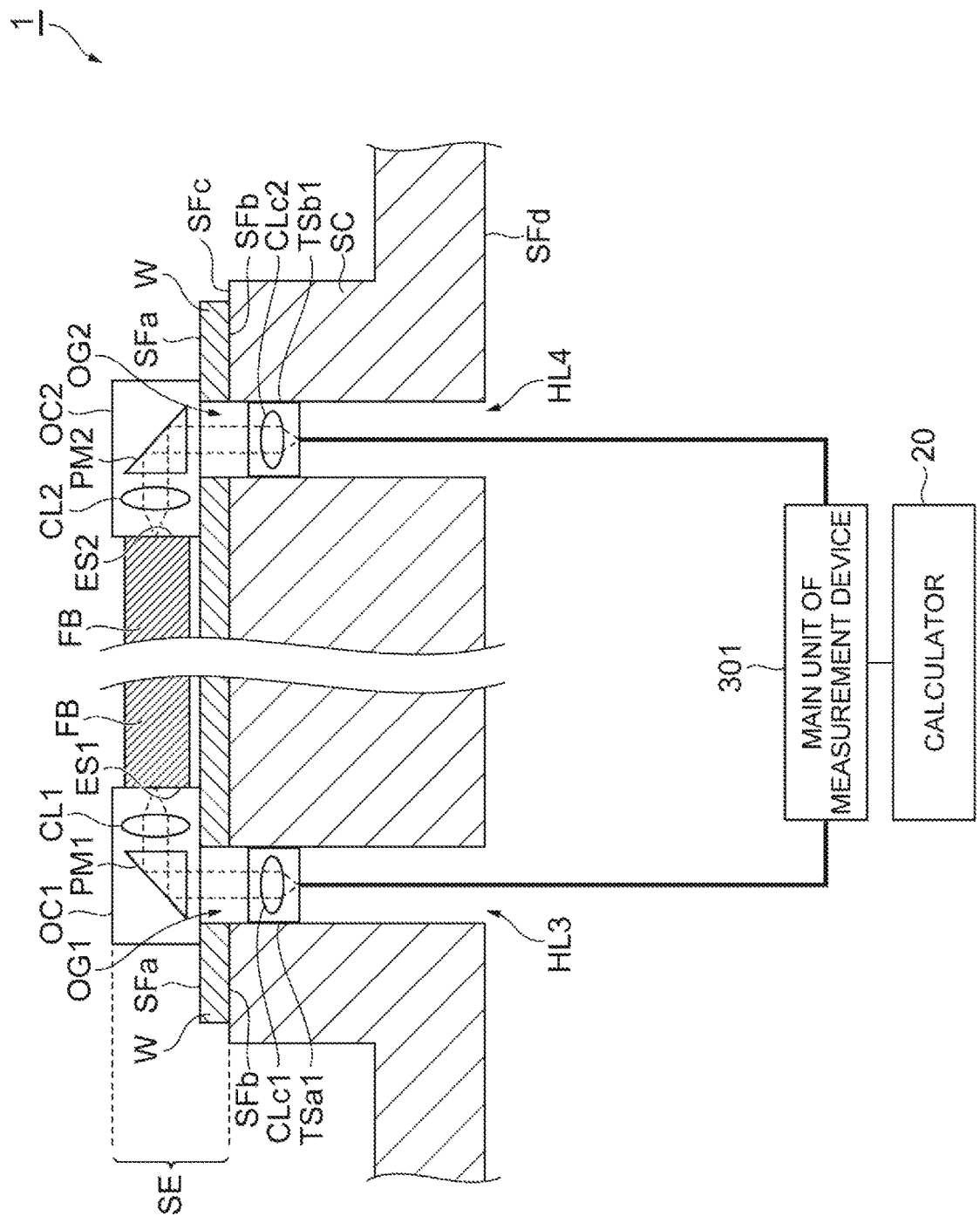
FIG. 6 is a diagram showing another configuration of the optical terminal and the temperature measurement sensor shown in FIG. 1 in more detail.

For example, the measurement device 30 may include an optical terminal TSa1 and an optical terminal TSb1 as shown in FIG. 6. Functions of the optical terminals TSa1 and TSb1 shown in FIG. 6 correspond to the functions of the optical terminals TSa and TSb shown in FIG. 2.

The electrostatic chuck SC shown in FIG. 6 includes a through hole HL3 and a through hole HL4. Each of the through hole HL3 and the through hole HL4 is provided separately from each of the through hole HL1 through which the optical waveguide portion PN1 (pusher pin) passes and the through hole HL2 through which the optical waveguide portion PN2 (pusher pin) passes. The through hole HL3 has the same configuration as the through hole HL4. Both the through holes HL3 and HL4 are spaces that communicate a space above the upper surface SFc with a space below the lower surface SFd. The light introduction path OG1 of the substrate W is disposed on the through hole HL3 of the electrostatic chuck SC, and the light introduction path OG1 and the through hole HL3 communicate with each other. The light introduction path OG2 of the substrate W is disposed on the through hole HL4 of the electrostatic chuck SC, and the light introduction path OG2 and the through hole HL4 communicate with each other.

The optical terminal TSa1 is connected to the beam splitter 32a of the main unit 301 through the optical fiber. The optical terminal TSa1 includes a collimating lens CLc1 (second collimating lens). The optical terminal TSa1 is disposed in the through hole HL3 of the electrostatic chuck SC. The optical coupling portion OC1 is disposed on the optical terminal TSa1 disposed in the through hole HL3. The optical terminal TSa1 may be attachably and detachably provided in the through hole HL3.

The measurement device 30 inputs the light into the optical fiber FB from the collimating lens CLc1 of the optical terminal TSa1 through the optical coupling portion OC1 and the end surface ES1. More specifically, the light emitted from the light source 31a of the main unit 301 reaches the collimating lens CLc1 of the optical terminal TSa1 and is emitted from the collimating lens CLc1 toward the optical coupling portion OC1.

The backscattered light emitted from the optical fiber FB through the end surface ES1 according to the light incident on the optical fiber FB through the end surface ES1 reaches the collimating lens CLc1 of the optical terminal TSa1. More specifically, the backscattered light emitted from the end surface ES1 reaches the collimating lens CLc1 of the optical terminal TSa1 through the optical coupling portion OC1 and reaches the beam splitter 32a from the collimating lens CLc1.

The optical terminal TSb1 is connected to the beam splitter 32b of the main unit 301 through the optical fiber. The optical terminal TSb1 includes a collimating lens CLc2 (second collimating lens). The optical terminal TSb1 is disposed in the through hole HL4 of the electrostatic chuck SC. The optical coupling portion OC2 is disposed on the optical terminal TSb1 disposed in the through hole HL4. The optical terminal TSb1 may be attachably and detachably provided in the through hole HL4.

The measurement device 30 inputs the light into the optical fiber FB from the collimating lens CLc2 of the optical terminal TSb1 through the optical coupling portion OC2 and the end surface ES2. More specifically, the light emitted from the light source 31b of the main unit 301 reaches the collimating lens CLc2 of the optical terminal TSb1 and is emitted from the collimating lens CLc2 toward the optical coupling portion OC2.

The backscattered light emitted from the optical fiber FB through the end surface ES2 according to the light incident on the optical fiber FB through the end surface ES2 reaches the collimating lens CLc2 of the optical terminal TSb1. More specifically, the backscattered light emitted from the end surface ES2 reaches the collimating lens CLc2 of the optical terminal TSb1 through the optical coupling portion OC2 and reaches the beam splitter 32b from the collimating lens CLc2.

The light can be incident on the temperature measurement sensor SE through the collimating lens CLc1 and the collimating lens CLc2. Therefore, the configuration of the optical system is simplified and the system is easily manufactured.

From the above description, it is understood that various embodiments of the present disclosure have been described in the present specification within the scope of the description purpose and various modifications may be made without departing from the scope and spirit of the present disclosure. Therefore, the various embodiments disclosed in the present specification are not intended to be limiting, the true scope and spirit of the present disclosure are indicated by the appended claims.

REFERENCE SIGNS LIST

1: temperature measurement system; 14: first pattern shape; 15: second pattern shape; 20: controller; 30: measurement device; 301: main unit; 31a: light source; 31b: light source; 32a: beam splitter; 32b: beam splitter; 33a: wavelength demultiplexer; 33b: wavelength demultiplexer; 34a: photodetector; 34b: photodetector; 35: signal processing unit; CL1: collimating lens; CL2: collimating lens; CLa1: collimating lens; CLa2: collimating lens; CLb1: collimating lens; CLb2: collimating lens; CLc1: collimating lens; CLc2: collimating lens; CN1: optical coupling portion; CN2: optical coupling portion; EG1: end portion; EG2: end portion; ES1: end surface; ES2: end surface; FB: optical fiber; HL1: through hole; HL2: through hole; HL3: through hole; HL4: through hole; MT: temperature measurement method; OC1: optical coupling portion; OC2: optical coupling portion; OG1: light introduction path; OG2: light introduction path; OPa: optical transceiver; OPb: optical transceiver; PM1: light reflector; PM2: light reflector; PN1: optical waveguide portion; PN2: optical waveguide portion; SC: electrostatic chuck; SE: temperature measurement sensor; SFa: upper surface; SFb: lower surface; SFc: upper surface; SFd: lower surface; TSa: optical terminal; TSa1: optical terminal; TSb: optical terminal; TSb1: optical terminal; W: substrate.

The invention claimed is:

1. A temperature measurement system comprising:
a measurement sensor comprising:
    a substrate;
    an optical fiber provided on an upper surface of the substrate and extending along the upper surface;
    a light introduction path of a space that allows a space above the upper surface and a space below a lower surface of the substrate to communicate with each other; and
    an optical coupling portion provided on the upper surface and disposed on the light introduction path,
    wherein the optical coupling portion is optically connected to an end surface of the optical fiber,
    wherein the optical fiber forms a first pattern shape and a second pattern shape,
    wherein the first pattern shape includes the optical fiber more densely than the second pattern shape, and
    wherein light incident on the optical coupling portion from a side of the lower surface through the light introduction path reaches the end surface through the optical coupling portion;
a measurement device that measures a temperature of the substrate of the measurement sensor,
wherein the measurement sensor is a temperature measurement sensor,
wherein the measurement device inputs the light into the optical fiber, which is included in the temperature measurement sensor and provided on the upper surface of the substrate, receives backscattered light emitted from the optical fiber according to the light, and measures the temperature of the substrate based on the received backscattered light,
wherein the measurement device includes a pusher pin,
wherein the pusher pin includes an optical waveguide portion,
wherein the measurement device inputs the light into the optical fiber through an end portion of the optical waveguide portion, and
wherein the backscattered light emitted from the optical fiber according to the light incident on the optical fiber is incident on the end portion.

2. The temperature measurement system according to claim 1,
wherein the end portion includes a convex lens.

3. The temperature measurement system according to claim 1,
wherein a material of the optical waveguide portion is sapphire.

4. The temperature measurement system according to claim 1,
wherein the measurement device includes a second collimating lens,
wherein the measurement device inputs the light into the optical fiber through the second collimating lens, and
wherein the backscattered light emitted from the optical fiber according to the light incident on the optical fiber is incident on the second collimating lens.

5. A measurement method comprising:
inputting light into an optical fiber extending along an upper surface of a substrate;
receiving backscattered light emitted from the optical fiber according to the light incident on the optical fiber in the inputting; and measuring a temperature based on the received backscattered light in the receiving, wherein, in the inputting, the light is incident on an optical coupling portion provided on the upper surface from a side of a lower surface through a light introduction path of a space that allows a space above the upper surface of the substrate and a space below the lower surface of the substrate to communicate with each other, wherein the optical coupling portion is optically connected to an end surface of the optical fiber, wherein the optical fiber forms a first pattern shape and a second pattern shape, wherein the first pattern shape includes the optical fiber more densely than the second pattern shape, wherein, in the inputting, the light is input into the optical fiber through an end portion of an optical waveguide portion of a pusher pin, and wherein the backscattered light emitted from the optical fiber according to the light incident on the optical fiber is incident on the end portion.

6. The temperature measurement system according to claim 1, wherein the light introduction path is a through hole or a cutout provided in the substrate.

7. The temperature measurement system according to claim 1, wherein the optical coupling portion includes a light reflector and a first collimating lens, wherein the light reflector is disposed on the light introduction path, wherein the first collimating lens is disposed between the light reflector and the end surface, and wherein the light incident on the optical coupling portion from the side of the lower surface through the light introduction path reaches the end surface through the light reflector and the first collimating lens in order.

8. The temperature measurement system according to claim 7, wherein the light reflector is a prism or a mirror.

9. The measurement method according to claim 5, wherein the temperature measured in the measuring is a temperature of the substrate.

10. The measurement method according to claim 9, wherein a series of steps of processing is alternately performed on two end surfaces of the optical fiber, the series of steps including:

the inputting the light, the receiving the backscattered light, and the measuring the temperature.

* * * * *